March 15, 1938.    F. E. HENDERSON    2,110,975

CORE AND A METHOD OF MAKING A CORE

Filed June 1, 1935

INVENTOR
F. E. HENDERSON
BY E. R. Nowlan
ATTORNEY

Patented Mar. 15, 1938

2,110,975

UNITED STATES PATENT OFFICE 2,110,975

CORE AND A METHOD OF MAKING A CORE

Fred E. Henderson, Riverside, Ill., assignor to Western Electric Company, Incorporated, New York, N. Y., a corporation of New York Application June 1, 1935, Serial No. 24,547

6 Claims. (Cl. 154—2.6)

This invention relates to cores and a method of making cores.

In the manufacture of electrical coils for inductances, transformers, relays, and the like, it is the practice in many instances to provide a hollow insulating core upon which the coil may be wound; and after winding the coil a magnetic core is inserted to fit snugly in the hollow insulating core.

Objects of the invention are to provide a rugged and economical core and an effective and efficient method of making the core.

In accordance with one embodiment of the invention, an elongated strip of material of fiber impregnated with a phenolic condensation product and faced with cellulose acetate is spirally wound on a mandrel to form a cylinder with the cellulose acetate facing on the outside and a second strip of paper impregnated with cellulose acetate is then wound spirally in the opposite direction thereover and adhered thereto to form a core.

A complete understanding of the invention may be had by reference to the following description taken in conjunction with the accompanying drawing, in which Fig. 1 is a fragmentary view of a core partly in longitudinal section;

Figure 1:
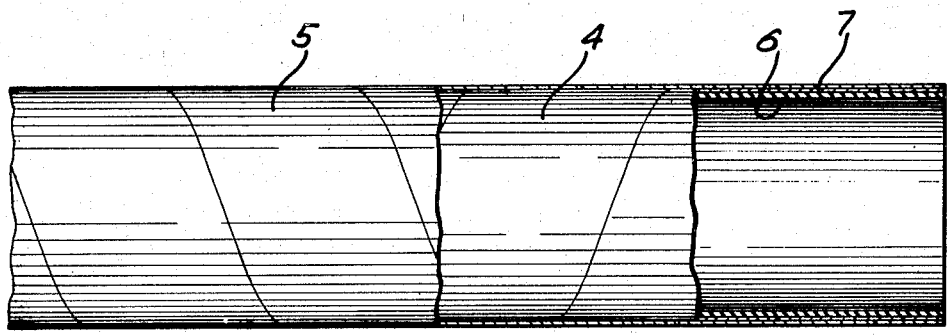
Figure 2:
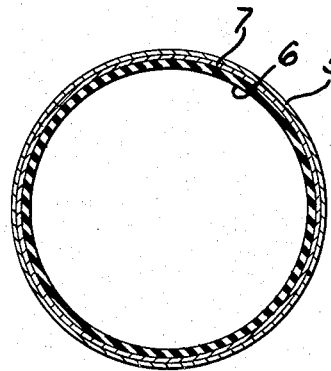
Fig. 2 is a cross sectional view of a core embodying the invention.
Figure 3:
Fig. 3 is a fragmentary sectional detail view of an element employed in the invention.

Referring now more in detail to the drawing, an elongated core is shown in Fig. 1. In practice, it has been found convenient to make a core for a number of coils in one piece, place the core on a mandrel and wind the coils thereon, and after the coils are wound the core is cut into sections corresponding to the number of coils wound thereon.

The core illustrated in the drawing is made of a spirally wound member 4 and a second member 5, which is wound spirally thereon in the opposite direction. The member 4 consists of an elongated strip or ribbon which may be made of an artificial resin, indicated at 6, such as a phenolic condensation product, or for a more economical construction, it may consist of a laminated structure comprising a plurality of sheets of fibrous material impregnated with phenol varnish and molded together to form a strip. In the preferred form of the invention, the member 4 has on its outer surface a facing of a cellulose derivative, indicated at 7, such as cellulose acetate, which may be either a sheet of pure cellulose acetate or a fiber sheet impregnated with cellulose acetate. In order to adhere the cellulose acetate sheet to the phenol fiber sheet to form the composite sheet 4, a sheet 8 impregnated with a mixture comprising a solution of cellulose acetate and phenol varnish may be interposed between the cellulose acetate sheet and phenol fiber sheet and the assembly subjected to heat and pressure to form a unitary structure.

The method of facing a phenol fiber sheet with a sheet of cellulose acetate is more fully disclosed in the patent to Willard P. Worrell and Francis E. Gruber No. 1,998,827, issued April 23, 135.

The member 4 is wound upon a mandrel in a spiral formation with the adjoining edges of the convolutions of the strip in abutting relationship. When the first layer 4 of the core has been thus formed, a strip 5 of fabric or paper impregnated with a cellulose derivative, such as cellulose acetate, is spirally wrapped around the core in the opposite direction. The side of this strip which contacts with the first layer 4 has an adhesive, such as cellulose acetate, dissolved in a suitable solvent, such as acetone, applied thereto. The solvent in this solution also plasticizes the cellulose acetate facing 7 on the member 4 and causes the strip 5 to adhere firmly thereto and at the same time coalesces the adjoining edges of the convolutions of the strip 4 to form an integral hermetically sealed tube of the strip 4. Some of the dissolved cellulose acetate also penetrates between the abutting edges of the phenol fiber base 6 of the strips 4 and forms a seal therebetween and a similar seal is formed between the edges of the convolutions of the superposed strip 5. Heat may be applied to the tube either during the process of manufacture or after the tube has been wound to accelerate the evaporation of the solvent in the adhesive. The outer strip 5, before application to the lower layer 4, is preferably dry and may be wound on a supply reel. The adhesive is then applied to the strip just prior to its application to the layer 4. A core of this type is peculiarly free from the corrosive effect induced by the differences of electrical potentials along its length and is particularly useful in connection with coils which are hermetically sealed to exclude moisture and the atmosphere.

The term "phenol fiber" or "phenol impregnated fiber" is used in the specification and claims to designate a fibrous material impregnated with a phenol condensation product and similarly the term "phenol varnish" is used to designate a varnish having as an ingredient thereof a phenol condensation product.

It will be evident that other coalescent substances, as, for example, cellulose nitrate, may be used in the facings of the side members and in the adhesive.

It will be understood that while a specific embodiment of the invention has been disclosed, many changes and modifications may be made therein without departing from the spirit and scope of the invention.

What is claimed is:

1. A core for electrical apparatus comprising fibrous material impregnated with a phenol resin faced with a cellulose derivative spirally wound to form a hollow core, and a layer of fibrous material impregnated with a cellulose derivative adhered to said facing.

2. A core for electrical apparatus comprising fibrous material impregnated with a phenol condensation product faced with a cellulose ester spirally wound to form a hollow core, the adjoining edges of the convolutions being in abutting relationship and coalesced to form an integral tube, and a layer of fibrous material impregnated with a cellulose ester coalesced thereto.

3. A core for electrical apparatus comprising fibrous material impregnated with a phenol condensation product faced with a cellulose ester spirally wound to form a hollow core, the adjoining edges of the convolutions being in abutting relationship and coalesced to form an integral tube, and fibrous material impregnated with a cellulose ester spirally wound thereover in the opposite direction and coalesced thereto.

4. A method of making a core for electrical apparatus which comprises winding a strip of phenol fiber faced with cellulose acetate into the form of a core with the edges of the convolutions in abutting relationship, coating a strip of material with a cellulose acetate solution, winding the coated strip against the facing on the phenol fibre, and drying the solution to coalesce the coated strip and the facing.

5. A core for electrical apparatus comprising fibrous material impregnated with a phenol condensation product and faced with a cellulose ester spirally wound to form a core, and a strip of a cellulose ester wound thereover and coalesced thereto.

6. A core for electrical apparatus comprising a spirally wound base layer comprising in the order named fibrous material impregnated with a phenol resin, a fibrous sheet impregnated with a mixture of a phenol resin and a cellulose ester, and a facing of cellulose ester, and a second layer wound thereover comprising a sheet of cellulose ester coalesced with said facing.

FRED E. HENDERSON.